United States Patent
Wang et al.

(10) Patent No.: US 9,784,497 B2
(45) Date of Patent: Oct. 10, 2017

(54) SMART REFRIGERATOR

(71) Applicant: MULTIMEDIA IMAGE SOLUTION LIMITED, Dublin (IE)

(72) Inventors: Jin Wang, Dublin (IE); Hong Gu, Dublin (IE); Li Mei, Dublin (IE)

(73) Assignee: MULTIMEDIA IMAGE SOLUTION LIMITED, Dublin (IE)

( * ) Notice: Subject to any disclaimer, the term of this patent is extended or adjusted under 35 U.S.C. 154(b) by 0 days.

(21) Appl. No.: 15/015,074

(22) Filed: Feb. 3, 2016

(65) Prior Publication Data

US 2017/0219276 A1 Aug. 3, 2017

(51) Int. Cl.
| | |
|---|---|
| G06K 9/00 | (2006.01) |
| F25D 29/00 | (2006.01) |
| G06K 9/66 | (2006.01) |
| H04N 5/247 | (2006.01) |

(52) U.S. Cl.
CPC .............. *F25D 29/00* (2013.01); *G06K 9/66* (2013.01); *H04N 5/247* (2013.01); *F25D 2500/06* (2013.01); *F25D 2700/06* (2013.01)

(58) Field of Classification Search
CPC .. F25D 29/00; F25D 2500/06; F25D 2700/06; G06K 9/66; H04N 5/247
USPC .................................................. 382/156–157
See application file for complete search history.

(56) References Cited

U.S. PATENT DOCUMENTS

| | | | | |
|---|---|---|---|---|
| 9,449,208 B2* | 9/2016 | Luk | ................... | F25D 29/005 |
| 9,503,635 B2* | 11/2016 | Ryu | ................... | H04N 5/2252 |
| 2004/0212723 A1* | 10/2004 | Lin | ................... | H04N 5/2353 |
| | | | | 348/362 |
| 2006/0096303 A1* | 5/2006 | Kavounas | ............... | F25D 29/00 |
| | | | | 62/125 |
| 2014/0214547 A1* | 7/2014 | Signorelli | .......... | G06Q 30/0267 |
| | | | | 705/14.64 |
| 2016/0033194 A1* | 2/2016 | Sumihiro | ............... | F25D 23/04 |
| | | | | 62/125 |
| 2016/0047587 A1* | 2/2016 | Sasaki | ................... | F25D 23/04 |
| | | | | 239/71 |
| 2016/0138859 A1* | 5/2016 | Stimpfig | ............... | F25D 27/005 |
| | | | | 62/125 |
| 2016/0148080 A1* | 5/2016 | Yoo | ................... | G06K 9/4628 |
| | | | | 382/157 |

* cited by examiner

*Primary Examiner* — Daniel Mariam
(74) *Attorney, Agent, or Firm* — Winston Hsu

(57) ABSTRACT

A smart refrigerator has a body having a shelf and a drawer, a door coupled to the body and has a plurality of trays. The shelf has a corresponding camera configured to capture an image of items on the shelf. The drawer has a corresponding camera configured to capture an image of items in the drawer. The trays have a corresponding camera configured to capture an image of items in the trays. The images captured by the cameras are processed to identify the type of the item and the location of the item within the smart refrigerator.

8 Claims, 6 Drawing Sheets

SMART REFRIGERATOR

BACKGROUND OF THE INVENTION

1. Field of the Invention

The present invention presents a smart refrigerator, more particularly, a smart refrigerator capable of capturing images and the images being used to train a neural network to identify items in the refrigerator.

2. Description of the Prior Art

As access to food become more convenient, the more food is wasted by the people. This is due to the reason that people lose track of thing that they have bought and put into storage. In the present, people commonly use a refrigerator to store food that has not yet been consumed. Sizes of refrigerators may vary according to the preference of a user. But, as the size of the refrigerator gets bigger, the larger the storage space is and things stored within are more easily forgotten. Thus, to reduce the food being wasted, there is a need to develop a way to keep track of the food stored within the refrigerator.

SUMMARY OF THE INVENTION

An embodiment of the present invention presents a smart refrigerator. The smart refrigerator comprises a body, a door coupled to the body, and a plurality of cameras disposed in the body. The body has a shelf and/or a drawer inside. The door may have a plurality of trays. Each of the plurality of cameras is configured to capture images of on the shelf, in the drawer, and in the trays of the door. The images are used to identify, preferably by a server, items inside the smart refrigerator train a neural network may be used for identifying the items.

Another embodiment of the present invention presents a method of identifying an item in a smart refrigerator. The method comprises a camera of the smart refrigerator capturing an image, the smart refrigerator collecting and transmitting the image captured by the camera to a server, the server identifying an item in the image, the server categorizing the item identified, the server determining the location of the items in the smart refrigerator, an application program processing the type of the items and the position of the items, the user generating a feedback according to an output of the application program, the server identifying the location of the user, and training a neural network according to the location of the user, and the feedback of the user.

A further embodiment of the present invention presents a smart refrigerator. The smart refrigerator comprising a body, a door coupled to the body, and a plurality of cameras disposed in the body. The body preferably has a shelf and/or a drawer inside. The door preferably has a plurality of trays. A first camera of the plurality of cameras is configured to capture images of items on the shelf and/or in the drawer, the first camera being configured to move through a track to change location. A second camera of the plurality of cameras preferably is configured to capture images of items in the trays of the door, and the images are used by a server to identify items inside the smart refrigerator and a neural network for identifying the items.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
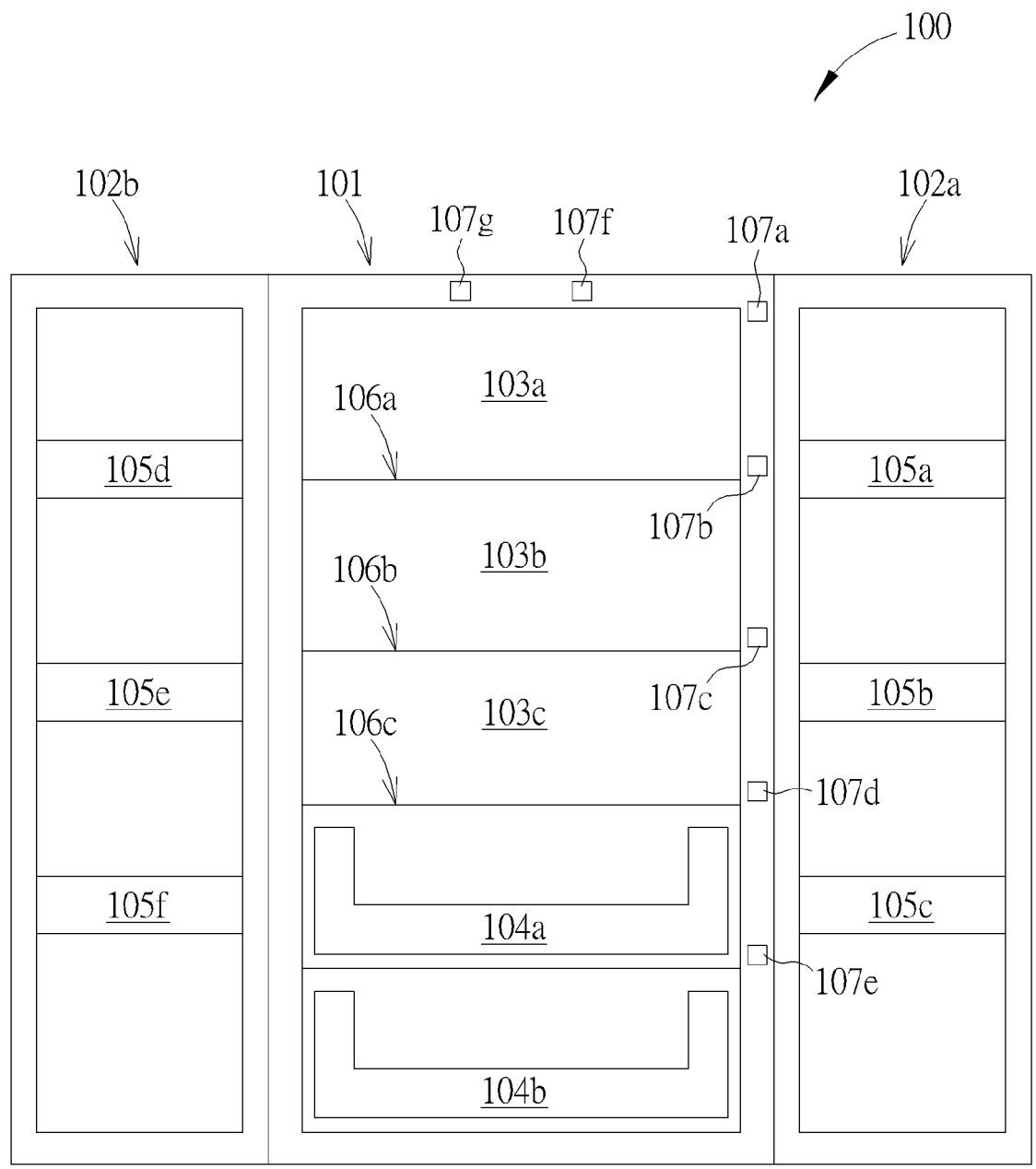
FIG. 1 illustrates a smart refrigerator according to an embodiment of the present invention.

FIG. 1 illustrates a smart refrigerator 100 according to an embodiment of the present invention. The smart refrigerator 100 may have a body 101, two doors 102a and 102b attached to the body 101, three shelves 103a, 103b, and 103c formed inside the body using dividers 106a, 106b, and 106c, and two drawers 104a and 104b. Each of the two doors 102a and 102b may have at least three trays 105a, 105b, 105c, 105d, 105e, and 105f. The dividers 106a, 106b, and 106c of the shelves 103a, 103b, and 103c may be formed using glass. The glass may be heavy duty to be able to support the items placed in the shelves. The two drawers 104a and 104b may be formed using a transparent material. Furthermore, each of the two drawers 104a and 104b may be partially opened to allow a better view of the items placed inside the drawers 104a and 104b. There is a plurality of cameras 107a, 107b, 107c, 107d, 107e, 107f, and 107g disposed within the smart refrigerator. The plurality of cameras 107a, 107b, 107c, 107d, 107e, 107f, and 107g may be used to capture images of the items stored in the shelves 103a, 103b, and 103c, the drawers 104a and 104b, and the trays 105a, 105b, 105c, 105d, 105e, and 105f of the smart refrigerator 100.

Since different users may have different preferences on storing items, the size of shelves 103a, 103b, and 103c may be adjusted by adjusting the positioning of the dividers 106a, 106b, and 106c within the body 101 of the smart refrigerator 100. However, for some embodiments of the smart refrigerator 100 in FIG. 1, the shelves 103a, 103b, and 103c may be assumed to have the same length and width. In the same way as the shelves 103a, 103b, and 103c, the positioning of the trays 105a, 105b, 105c, 105d, 105e, and 105f may also be adjustable according to the preference of the user. Furthermore, the trays 105b and 105e are adjustable such that the trays 105b and 105e may be move to a higher position corresponding to the doors 102a and 102b to allow the cameras 107f and 107g to have a better view of the trays 105c and 105f.

For cameras 107a, 107b, 107c, 107d, and 107e, ordinary cameras may be used since the cameras 107a, 107b, 107c, 107d, and 107e are designated to capture the same area of the smart refrigerator 100.

In the embodiment of FIG. 1, a corresponding camera 107a, 107b, and 107c is pointed at each of the shelves 103a, 103b, and 103c. The camera 107a is pointed at shelf 103a. The camera 107b is pointed at shelf 103b. The camera 107c is pointed to shelf 103c. The positioning of cameras 107a, 107b, and 107c should allow the cameras 107a, 107b, and 107c to capture the most number of items in the corresponding shelf 103a, 103b, and 103c while having the most space between the items. In this way, the captured images may be at optimal quality for processing. Therefore, for optimal image quality, the cameras 107a, 107b, and 107c may be placed in the furthest possible position from the divider 106a, 106b, and 106c without having another part of the smart refrigerator 100 obstructing the view of the cameras 107a, 107b, and 107c. FIG. 1 shows an embodiment for which a possible positioning of the cameras 107a, 107b, and 107c is shown. The camera 107a, 107b, and 107c may each capture an image after at least one of the doors 102a and 102b have been closed. In this way, the exposure of the image taken may be lowered. Also, in this way, the uniformity of the quality of the images for a duration of time may be maintained by maintaining the lighting the camera 107a, 107b, and 107c is exposed to when taking the image. In some embodiments, the lighting maintained may be provided by a light bulb or other light source inside the body selectively turned on and off according to whether the door is open or closed or other design considerations, such as needing lumination for capturing the image. The field of view (FOV) of the camera 107a, 107b, and 107c may be set to 0.5. The field of view (FOV) may be defined as the extent of the observable world that is seen at any given moment by the camera 107a, 107b, and 107c. A 0.5 field of view (FOV) may also be the same as having a 45 degree field of vision.

In the embodiment of FIG. 1, each of the drawers 104a and 104b has a corresponding camera 107d and 107e pointed to it. The camera 107d is pointed to drawer 104a. And, the camera 107e is pointed to the drawer 104b. The positioning of cameras 107d and 107e should allow the cameras 107d and 107e to capture the most number of items in the corresponding drawer 104a and 104b while having the most space between the items. In this way, the captured images may be at optimal quality for processing. Therefore, for optimal image quality, the camera 107d and 107e may be placed in the furthest possible position from the drawers 104a and 104b without having another part of the smart refrigerator 100 obstructing the view of the camera 107d and 107e. FIG. 1 shows an embodiment for which a possible positioning of the cameras 107d and 107e is shown. The camera 107d and 107e may each capture an image after at least one of the doors 102a and 102b have been closed. In this way, the exposure of the image taken may be lowered. Also, in this way, the uniformity of the quality of the images for a duration of time may again be maintained by maintaining the lighting the camera 107d and 107e is exposed to when taking the image. The field of view (FOV) of the camera 107d and 107e may be set to 0.5. The field of view (FOV) may be defined as the extent of the observable world that is seen at any given moment by the camera 107d and 107e. A 0.5 field of view (FOV) may also be the same as having a 45 degree field of vision.

Since the trays 105a, 105b, 105c, 105d, 105e, and 105f are on the two doors 102a and 102b of the smart refrigerator 100, the trays 105a, 105b, 105c, 105d, 105e, and 105f may move as the two doors 102a and 102b move. Thus, the position of the trays 105a, 105b, 105c, 105d, 105e, and 105f according to cameras 107f, and 107g is constantly changing. For cameras 107f, and 107g, cameras having mechanical shutter may be used since the objective of the cameras 107f, and 107g is to capture images of the trays 105a, 105b, 105c, 105d, 105e, and 105f of the corresponding door 102a and 102b.

In the embodiment of FIG. 1, a corresponding camera 107f and 107g is pointed at each of the doors 102a and 102b. The camera 107f is pointed at door 102a. And, the camera 107g is pointed at the door 102b. The positioning of cameras 107f and 107g should allow the cameras 107f and 107g to capture the most number of items in the corresponding doors 102a and 102b while the door 102a and 102b is from 75 to 90 degrees open. In this embodiment, at least two images of the trays 05a, 105b, 105c, 105d, 105e, and 105f on the doors 102a and 102b may be taken. A camera 107f and 107g may take a first image when a corresponding door 102a and 102b is opened at 75 degrees and the second image may be taken when the second image may be taken when the door 102a and 102b is opened at 90 degrees. In this way, the captured images may be at optimal quality for processing. Therefore, for optimal image quality, the camera 107f and 107g may be placed in the furthest possible position from the doors 102a and 102b without having another part of the smart refrigerator 100 obstructing the view of the camera 107f and 107g. FIG. 1 shows an embodiment for which a possible positioning of the cameras 107f and 107g is shown.

At least two sensors may be placed in the smart refrigerator 100 to determine whether a door is open and determine the degree of opening of the door. The captured images of the cameras 107a, 107b, 107c, 107d, 107e, 107f, and 107g may have a timestamp showing the date and time when the images have been captured.

Figure 2:
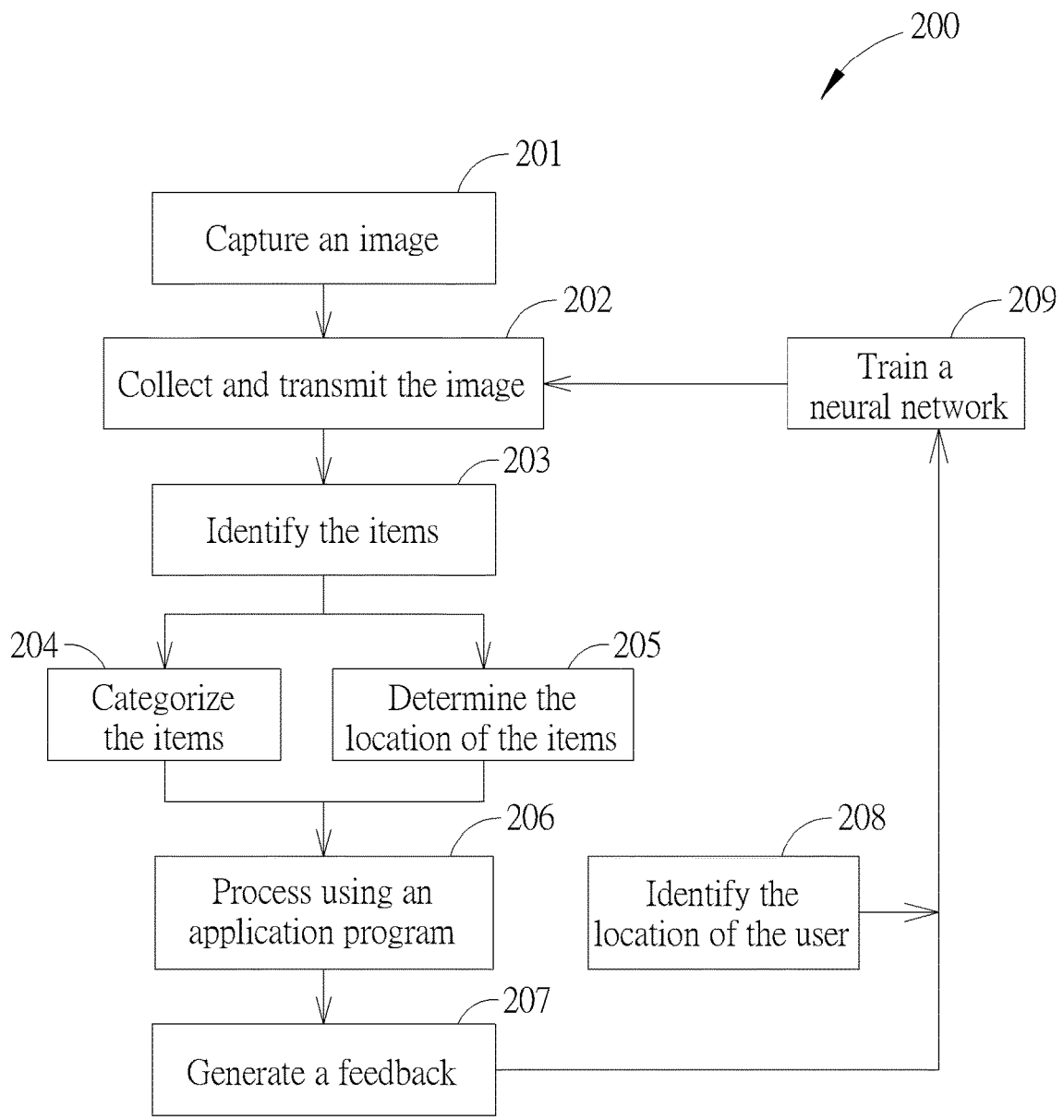
FIG. 2 illustrates a flowchart of a method of processing images captured by the cameras of the smart refrigerator in FIG. 1.

FIG. 2 illustrates a flowchart 200 of a method of processing images captured by the cameras of the smart refrigerator in FIG. 1. The method in FIG. 2 may include, but is not limited to, the following steps:

Step 201: A camera of the smart refrigerator capturing an image;

Step 202: The smart refrigerator collecting and transmitting the image captured by the camera to a server;

Step 203: The server identifying the items in the image;

Step 204: The server categorizing the items identified;

Step 205: The server determining the location of the items in the smart refrigerator; (Step 205 may be executed simultaneously with step 204);

Step 206: An application program processing the type of the items and the position of the items;

Step 207: The user generating a feedback according to an output of the application program;

Step 208: The server identifying the location of the user; and

Step 209: Training a neural network according to the location of the user, and the feedback of the user.

In step 201, the camera of the smart refrigerator may capture an image. Since the smart refrigerator has more than one camera, multiple images may be taken simultaneously.

In step 202, the smart refrigerator may collect and transmit the image captured by the camera to a server. The smart refrigerator may have a processor capable of performing step 202. The number of image simultaneously collected and transmitted to the server may depend on the number of camera activated at a time. The smart refrigerator may have a transmitter module used to transmit the image to the server through the internet. Furthermore, the transmitter module may use wireless technology such as Wi-Fi® to connect to the internet.

In step 203, the server may identify the items in the image. More particularly, the server may run an algorithm to identify the items.

In step 204, the server may use a program to categorize the items identified. For example, the items in the refrigerator may be foods and the foods may be categorized under types such as dairy, vegetable, fruits, meat, or carbohydrates although other categories, for example categories defined by expiration dates, may be used. It may be noted that the server may already have stored data including images of items and corresponding name and category used for identification of the item before a smart refrigerator is initially used. Furthermore, when the item is packaged, such as milk or juice, images of the package in all angles may be captured and stored in the server. A way of capturing an image of a package in all angles is by placing the package in a rotating plate and having a camera capture a plurality of picture. The data may initially be manually collected and stored in the server and is built up by the neural network as time progresses and the smart refrigerator is used.

In step 205, the server may use a program to determine the location of the items in the smart refrigerator. For example, when the item is part of the image taken by camera 107a of the smart refrigerator 100 in FIG. 1, it is known that the item is placed in the shelf 103a of the smart refrigerator 100. The program of the server may then determine which part of shelf 103a is the item located.

In step 206, the application program may process the type of the items and the position of the items determined by the server. The application program may be used to combine the type of the items and the position of the items to a user readable message to be sent to the user. Such user readable message may be a copy of the image having the identified items labeled with its type. The application program may be accessible to a user through a display panel on the smart refrigerator, a computer, or a mobile device.

In step 207, the user may generate a feedback according to an output of the application program. The feedback may be used to indicate whether the identification of the item is right or wrong.

In step 208, the server may identify the location of the user. The location of the user may be identified through user input or through Global Positioning System (GPS).

In step 209, training a neural network according to the items identified, the location of the user, and the feedback of the user. The neural network may be a convolutional neural network and may be trained by learning from each identification of item done by the server. Some items that may be found in a refrigerator may look very similar to one another. By determining whether an identification made is right or not, the neural network can gradually learn from prior identification. The location of the user is used to compare the difference of the appearance of the same item at different locations. For example, an apple farmed in different country may have different size and shape. An apple grown in Japan may have a bigger size than an apple grown in Taiwan. Although the apple farmed in different countries look different from each other, the neural network of the present invention may be able to learn that the items captured in the image in these two locations are of the same category. A database may act as the memory of the neural network where the feedback from the user and the location of the user from past identification are stored. By comparing the correct and incorrect identifications made in the past, the neural network may be able to improve its accuracy of identifying the item as time pass. The neural network may be used by the system to accurately identify the items in the image.

Note that step 208 is an optional step during the implementation of the method of processing images captured by the cameras of the smart refrigerator. The neural network may use the location of the user to further simplify the identification of the items by limiting the comparison in the database to items only found in the specific location of the user.

Figure 3:
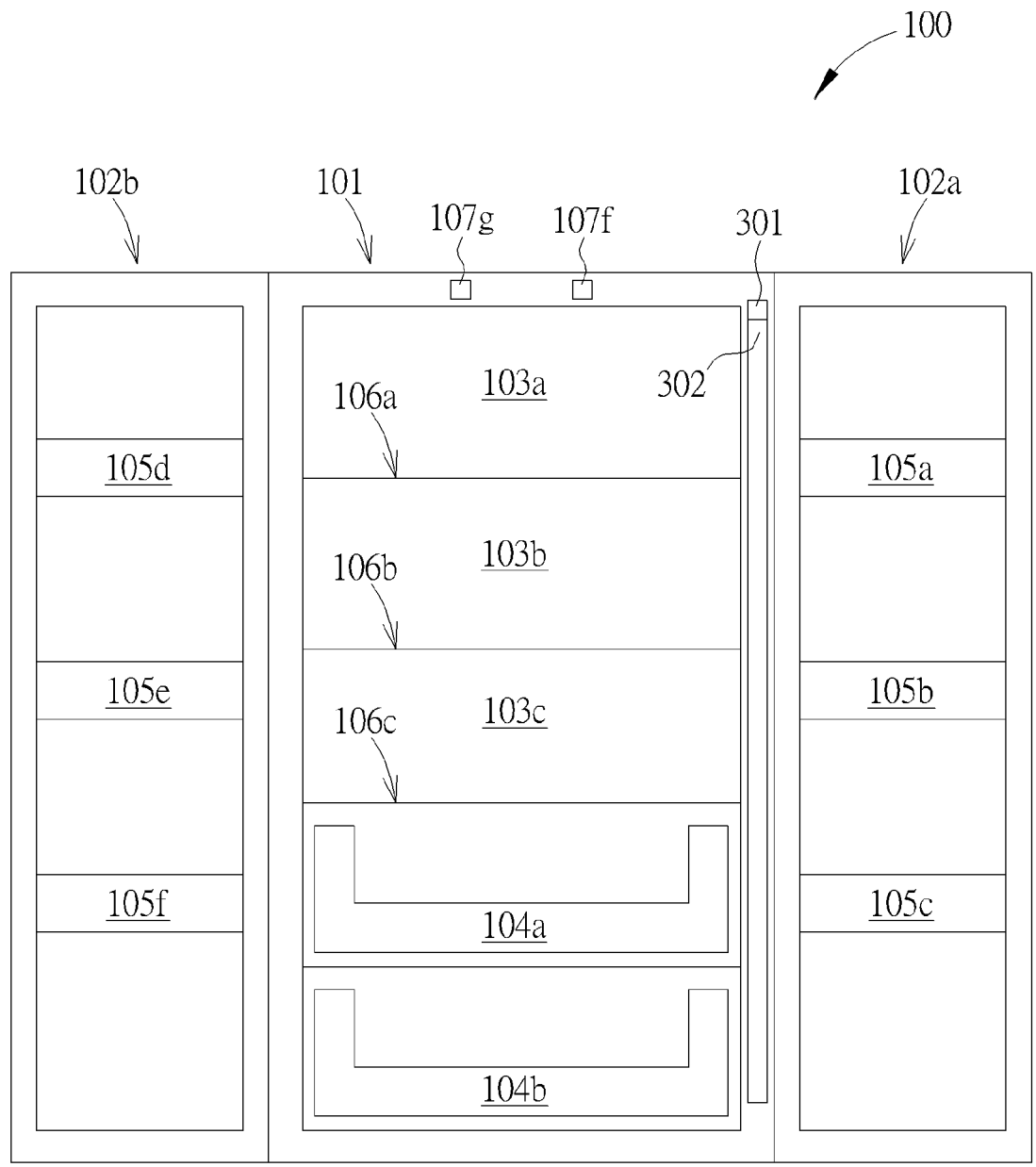
FIG. 3 illustrates a smart refrigerator 300 according to an embodiment of the present invention.

FIG. 3 illustrates a smart refrigerator 300 according to an embodiment of the present invention. Instead of having a plurality of cameras used to capture images of the shelves and the drawers of the smart refrigerator as shown in FIG. 1, the smart refrigerator 300 may have one camera 301 configured to move along a track 302 to capture images of the shelves 103a, 103b, and 103c and the drawers 104a and 104b. In this embodiment, since there is only one camera 301 taking images of the shelves 103a, 103b, and 103c and the drawers 104a and 104b, the images may be taken sequentially according to the detection of opening of at least one door 102a and 102b. The field of vision and positioning of the camera 301 when taking may be the same as described for the embodiment in FIG. 1. Thus, it is no longer discussed for brevity. Furthermore, the neural network may further be used to identify the freshness of the items in the smart refrigerator, the amount of each item in the smart refrigerator, and the average time an item in the smart refrigerator is consumed.

Figure 4:
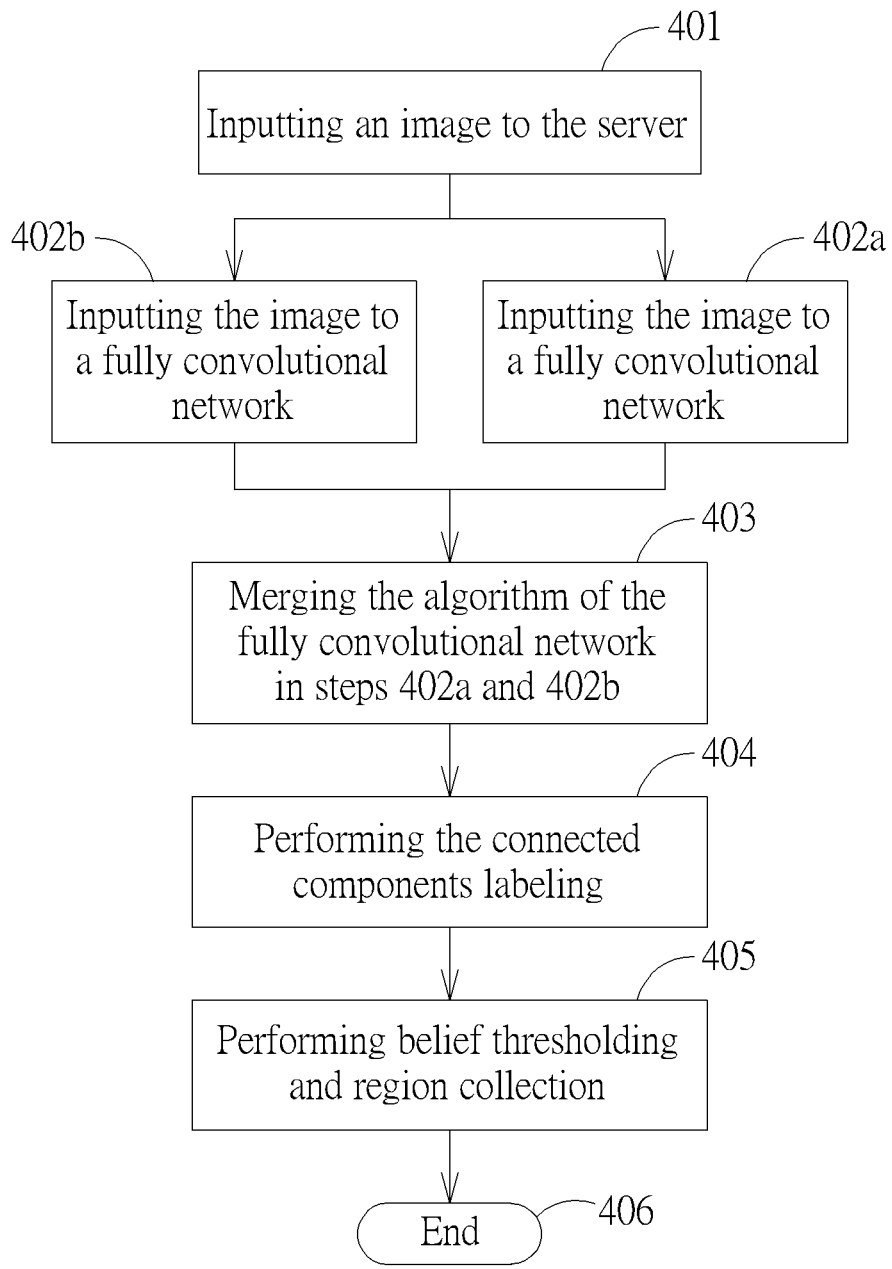
FIG. 4 illustrates a flowchart of a method of identifying an item in the smart refrigerator in FIG. 1.
Figure 5:
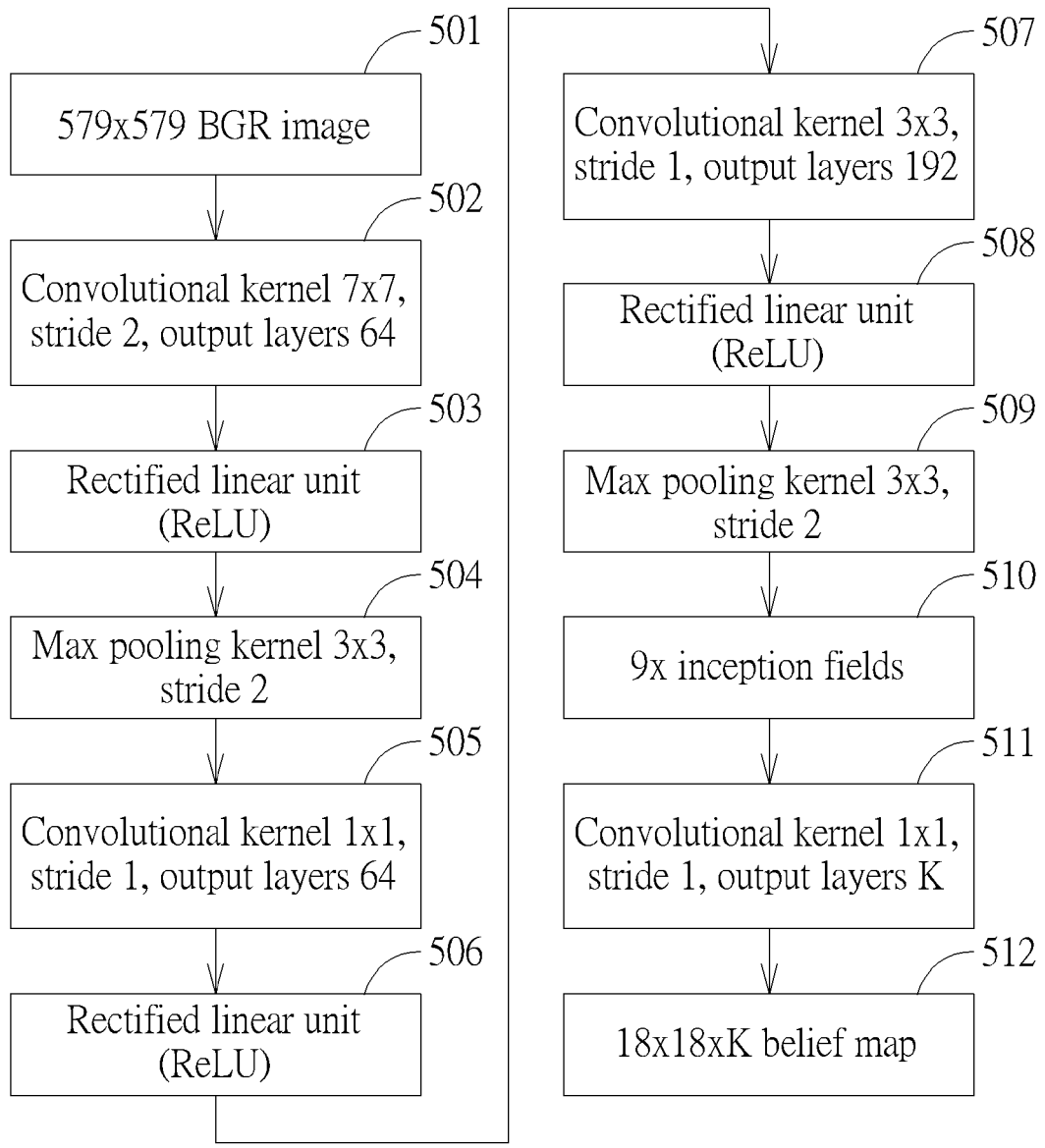
FIG. 5 illustrates a flowchart of a method of executing a fully convolutional neural network of FIG. 4.
Figure 6:
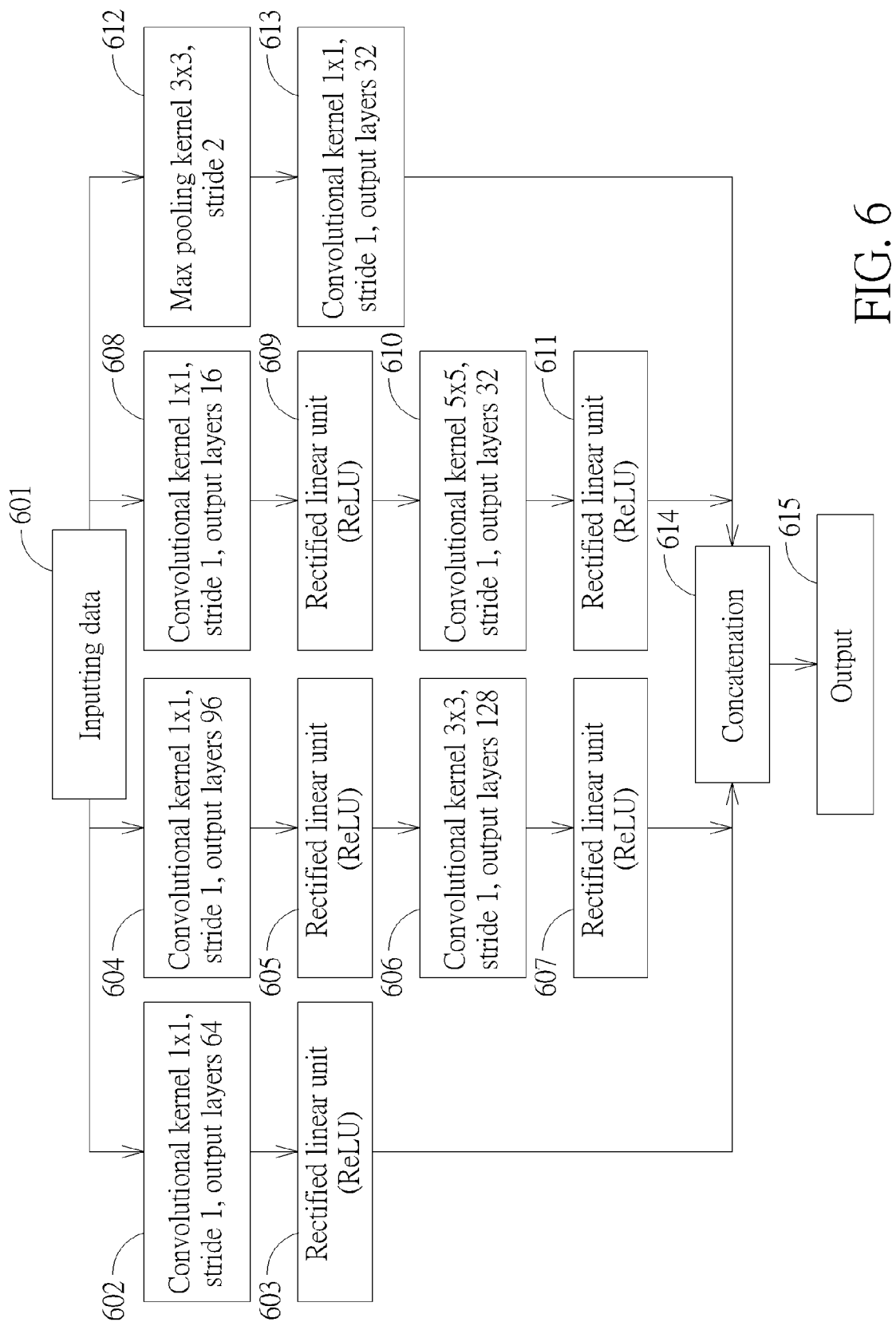
FIG. 6 illustrates a flowchart of a method of executing an inception field of FIG. 5.

In addition, FIG. 4 illustrates a flowchart of a method of identifying an item in the smart refrigerator in FIG. 1. FIG. 5 illustrates a flowchart of a method of executing a fully convolutional neural network of FIG. 4. The method of executing a fully convolutional neural network in FIG. 5 is used in step 402a and 402b of FIG. 4. FIG. 6 illustrates a flowchart of a method of executing an inception field of FIG. 5. The method of executing an inception field in FIG. 6 is used in step 510 of FIG. 5.

The method in FIG. 4 may include, but is not limited to, the following steps:
Step 401: Inputting an image to the server;
Step 402a: Inputting the image to a fully convolutional neural network;
Step 402b: Inputting the image to a fully convolutional neural network;
Step 403: Merging the algorithm of the fully convolutional neural network in steps 402a and 402b;
Step 404: Performing the connected components labeling;
Step 405: Performing belief thresholding and region collection;
Step 406: End.

Note that the method of identifying the item in the smart refrigerator uses a dual fully convolutional neural network as shown in step 402a and 402b to increase the recognition rate the item. However, the present invention is not limited to having only two fully convolutional neural networks working at the same time. If needed additional fully convolutional neural network may be added to the method to further increase the recognition rate.

The method in FIG. 5 may include, but is not limited to, the following steps:
Step 501: Inputting a 579×579 BGR image;
Step 502: Generating 64 feature maps by convolving with a 7×7×64 tensor kernel with stride 2;
Step 503: Input the feature maps to a rectified linear unit (ReLU);
Step 504: Generating a max pooling kernel 3×3 with stride 2;
Step 505: Generating 64 feature maps by convolving with a 1×1×64 tensor kernel with stride 1;
Step 506: Input the feature maps to a rectified linear unit (ReLU);
Step 507: Generating 192 feature maps by convolving with a 3×3×192 tensor kernel with stride 1;
Step 508: Input the feature maps to a rectified linear unit (ReLU);
Step 509: Generating a max pooling kernel 3×3 with stride 2;
Step 510: Performing a 9× inception fields;
Step 511: Generating K feature maps by convolving with a 1×1×K tensor kernel with stride 1;
Step 512: Generating an 18×18×K belief map.

The method in FIG. 6 may include, but is not limited to, the following steps:
Step 601: Inputting data;

Step 602: Generating 64 feature maps by convolving with a 1×1×64 tensor kernel with stride 1;

Step 603: Input the feature maps to a rectified linear unit (ReLU);

Step 604: Generating 96 feature maps by convolving with a 1×1×96 tensor kernel with stride 1;

Step 605: Input the feature maps to a rectified linear unit (ReLU);

Step 606: Generating 128 feature maps by convolving with a 3×3×128 tensor kernel with stride 1;

Step 607: Input the feature maps to a rectified linear unit (ReLU);

Step 608: Generating 64 feature maps by convolving with a 1×1×64 tensor kernel with stride 1;

Step 609: Input to a rectified linear unit (ReLU);

Step 610: Generating 32 feature maps by convolving with a 5×5×32 tensor kernel with stride 1;

Step 611: Input the feature maps to a rectified linear unit (ReLU);

Step 612: Generating a max pooling kernel 3×3 with stride 2;

Step 613: Generating 32 feature maps by convolving with a 1×1×32 tensor kernel with stride 1;

Step 614: Performing concatenation;

Step 615: Generating an output.

The present invention is a smart refrigerator that is able to capture images of the food stored inside by using one or a plurality of cameras. The images are processes using digital signal processes as disclosed in FIGS. 5-6. The image processing may be done locally by the processing module or remotely on a server. The server may also be used to store a database of all the items captured and identified not only by a single smart refrigerator, but items captured and identified by smart refrigerators in different locations (since different farms may yield the same item but have different size or shape). The database is used by a neural network to identify items accurately. The neural network will be able to learn from past identifications to increase the accuracy of identification as time goes. The identifications may also be set to determine other features such as when the items in the smart refrigerator will expire or if there is more than one of the same item stored in the smart refrigerator. The expiration of the item may be determined according to the period of time the item has been in the smart refrigerator. The database manager may look up the item in the database to determine how long an item has been stored within the smart refrigerator.

Additional embodiments of the present invention present a smart refrigerator system. The smart refrigerator system comprises a body, a door, a plurality of cameras, and a processing module. The body has a shelf and a drawer inside. The door is coupled to the body and has a plurality of trays. The plurality of cameras is disposed in the body and each of the plurality of cameras is configured to capture images of items on at least one of the shelf, the drawer, and the trays of the door. The processing module is configured to use the images to identify the items inside the smart refrigerator. In some embodiments, a first camera of the plurality of cameras is configured to move along a track to change location inside the body to capture images of the shelf and the drawer and a second camera of the plurality of cameras is configured to capture image of the trays of the door.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of identifying an item in a smart refrigerator, the method comprising:
a camera of the smart refrigerator capturing an image;
the smart refrigerator collecting and transmitting the image captured by the camera to a server;
the server identifying an item in the image;
the server categorizing the item identified;
the server determining the location of the items in the smart refrigerator;
an application program processing types of the items and positions of the items;
a user generating a feedback according to an output of the application program;
the server identifying the location of the user; and
training a neural network according to the location of the user, and the feedback of the user.

2. The method of claim 1, wherein the camera of the smart refrigerator capturing the image is the camera of the smart refrigerator capturing the image of a shelf, a drawer, or trays of the smart refrigerator.

3. The method of claim 1, wherein the image is transmitted to the server through the Internet using a wireless connection.

4. The method of claim 1, wherein the server simultaneously performs categorizing the item identified and determining the location of the item in the smart refrigerator.

5. The method of claim 1, wherein the application program processing the type of the items and the position of the items is an application program accessible to a user through a display panel on the smart refrigerator, a computer, or a mobile device.

6. The method of claim 1, wherein the feedback of the user is a confirmation whether the item has been identified correctly or not.

7. The method of claim 1, wherein when the camera capturing the image corresponds to a camera pointed at a shelf or a drawer, the camera is an ordinary camera having a 45 degree field of vision.

8. The method of claim 1, wherein when the camera capturing the image corresponds to a camera pointed at trays on a door of the smart refrigerator, the camera is a camera having mechanical shutter and captures the image of the trays when the door is at a 75 degree angle and at a 90 degree angle relative to a side of the body where the door rests when the door is closed.

* * * * *